United States Patent [19]
Arashi et al.

[11] 3,803,804
[45] Apr. 16, 1974

[54] APPARATUS FOR DESULFURIZATION OF EXHAUST GAS

[75] Inventors: Norio Arashi; Yukio Hishinuma, both of Hitachi, Japan

[73] Assignee: Hitachi, Ltd., Tokyo, Japan

[22] Filed: Nov. 18, 1971

[21] Appl. No.: 200,020

[30] Foreign Application Priority Data
Nov. 24, 1970 Japan.............................45-102740

[52] U.S. Cl.............................. 55/73, 55/89, 55/223, 55/229, 55/233, 55/242, 55/257, 55/387, 261/DIG. 9, 423/244, 423/522
[51] Int. Cl............................................. B01d 53/04
[58] Field of Search.............. 55/73, 68, 74, 76, 84, 55/89, 90, 93, 94, 179, 180, 196, 208, 220, 225, 226, 227, 229, 233, 257, 259, 287, 242, 387; 261/127, 128, 129, 130, 151, 94, 95, 96, 97, 98, 99, 115, 117, 118, DIG. 9; 423/210, 213, 220, 222, 242, 244, 511, 522, 528, 532, 539, 540

[56] References Cited
UNITED STATES PATENTS
| | | | |
|---|---|---|---|
| 789,634 | 5/1905 | Schroeder............................ | 55/73 X |
| 2,028,318 | 1/1936 | Carter.................................. | 55/73 X |
| 2,206,528 | 7/1940 | Corey et al. ......................... | 55/73 X |
| 2,598,116 | 5/1952 | DuBois ................................ | 55/73 |
| 2,736,390 | 2/1956 | Wickland............................. | 55/223 |
| 3,473,297 | 10/1969 | Tamura et al. .................... | 55/180 X |
| 3,475,133 | 10/1969 | Muller-Wartenberg......... | 55/223 UX |
| 3,486,852 | 12/1969 | Tamura et al. ..................... | 55/74 X |
| 3,581,472 | 6/1971 | Grosick............................... | 261/22 |

Primary Examiner—Dennis E. Talbert, Jr.
Attorney, Agent, or Firm—Craig, Antonelli & Hill

[57] ABSTRACT

An apparatus for removing sulfur oxides contained in the exhaust gas. The apparatus is provided with, in each desulfurization tower thereof, an adsorbent for adsorption of sulfur oxides, and a distributor is disposed in the upper portion of the lower chamber formed in the tower immediately below the adsorbent layer so as to spray a desorption solution such as water to cause the liquid-gas contact between the desorption solution containing sulfuric acid and the exhaust gas in the lower chamber of the tower.

7 Claims, 3 Drawing Figures

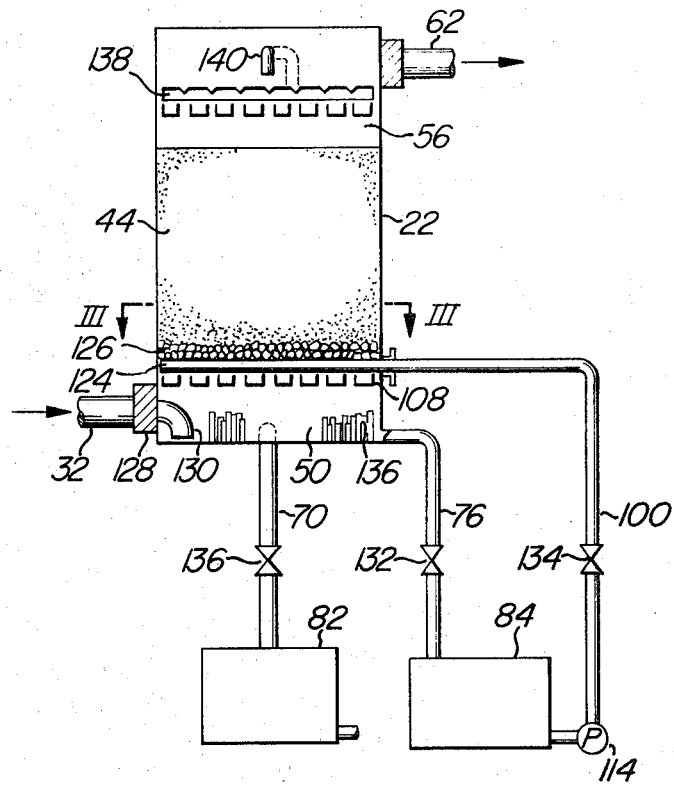
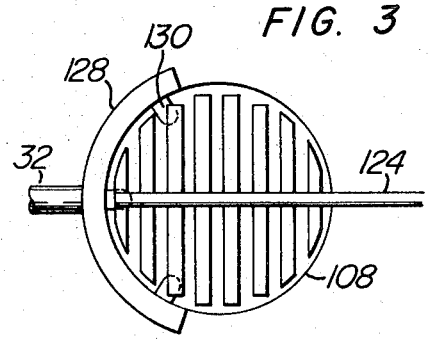

APPARATUS FOR DESULFURIZATION OF EXHAUST GAS

BACKGROUND OF THE INVENTION

The present invention relates to an apparatus for removal of sulfur oxides such as $SO_2$, $SO_3$ or the like from the exhaust gases from a boiler, a chemical apparatus, an industrial or municipal heat power source, a gas turbine, an iron manufacturing apparatus and the like.

There have been known several processes for removal of sulfur oxides from exhaust gas in which a tower packed with activated carbon layers is used. In one of these processes the activated carbon particles are fluidized in the activated carbon tower or desulfurization tower to make them contact with the exhaust gas to remove the sulfur oxides of the exhaust gas, and a desorption gas is used to remove the sulfur oxides absorbed by the activated carbon particles. In the other process, a plurality of activated carbon towers are disposed in side by side relation so that some of them are used for adsorption whereas the remaining towers are used for desorption. In addition, there have been proposed a method for using water as a desorption solution, and a method for drying with the exhaust gas or any other suitable gas after washing. These processes and methods have been proposed for controlling the air pollution, but they have many problems to be solved before they are used in practice.

SUMMARY OF THE INVENTION

One of the objects of the present invention is to provide an apparatus for desulfurization of exhaust gas, which is simple in construction, requires a less installation space and is manufactured at less cost.

Another object of the present invention is to provide an apparatus for desulfurization of exhaust gas in which the temperature and the humidity of exhaust gas to be introduced into an adsorbent layer is so controlled that the efficiency of sulfur oxides absorption by the adsorbent layer may be much enhanced.

Another object of the present invention is to provide an apparatus for desulfurization of exhaust gas in which the decrease in temperature and humidity of exhaust gas during the treatment in the apparatus is so well controlled that the treated gas may be emerged from a stack without any difficulty.

Another object of the present invention is to provide an apparatus for desulfurization of exhaust gas in which water is used as a desorption solution for removal of sulfur oxides adsorbed by the adsorbent so that the concentration of sulfuric acid solution may be increased.

Another object of the present invention is to provide the optimum process for removal of sulfur oxides from exhaust gas.

The above and other objects, features and advantages of the present invention will become more apparent from the following description of the preferred embodiment thereof taken in conjunction with the accompanying drawing.

BRIEF DESCRIPTION OF THE DRAWING

FIG. 2 is a diagrammatic view, on enlarged scale, illustrating one part of FIG. 1; and FIG. 3 is a sectional view taken along the line III—III of FIG. 2.

DESCRIPTION OF THE PREFERRED EMBODIMENT

Figure 1:
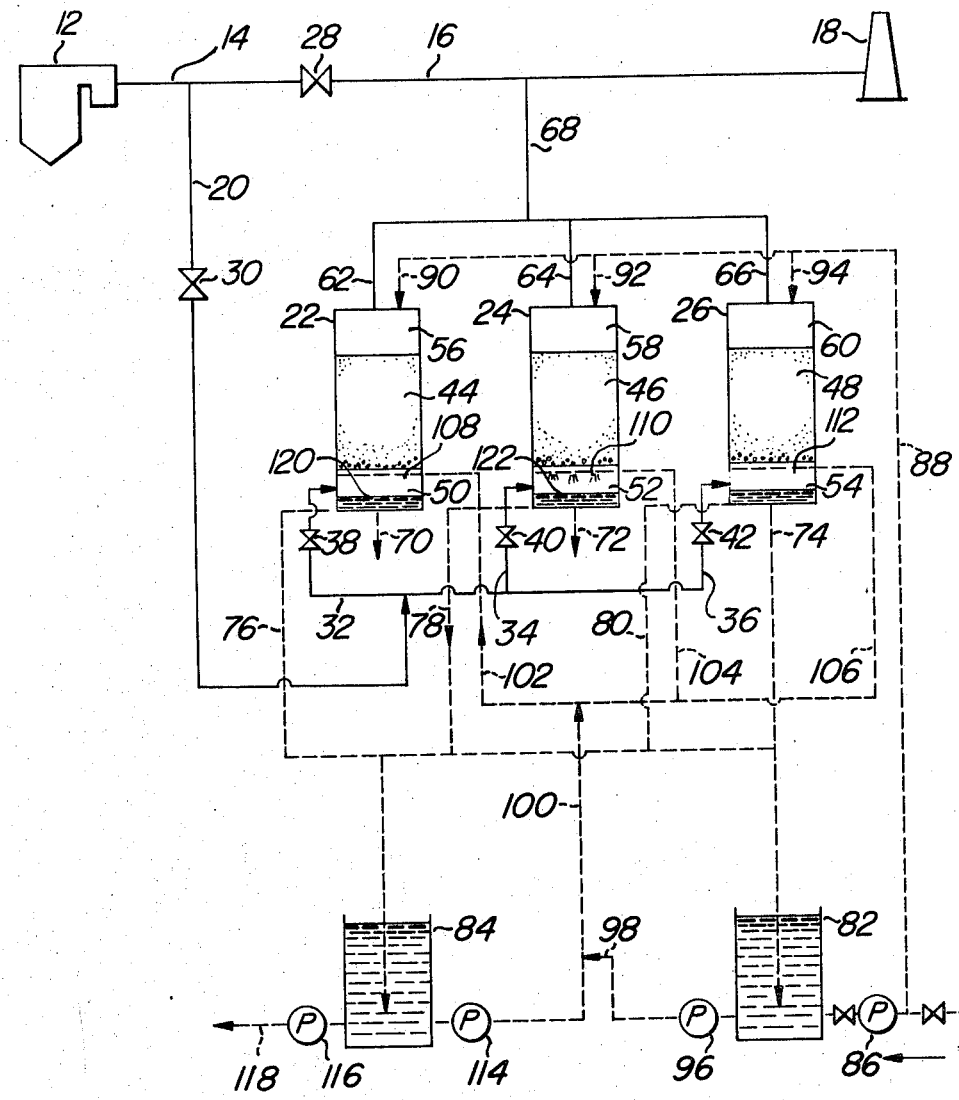
FIG. 1 is a block diagram of one preferred embodiment of an apparatus in accordance with the present invention.

Referring to FIG. 1, the exhaust gases from a boiler 12 are discharged through flues 14 and 16 from a stack 18. To remove sulfur oxides in the exhaust gases, they are introduced through a flue 20 branched from the flue 14 into the lower chambers 50, 52 and 54 of desulfurization towers 22, 24 and 25 respectively. Suitable valves 28 and 30 are provided in the flues 16 and 20, respectively. In the instant embodiment, only three desulfurization towers are shown, but it should be understood that the present invention may be carried out with any number of desulfurization towers. However, the continuous exhaust gas treatment will be disadvantageous with only one desulfurization tower.

The flue 20 is branched into three ducts 32, 34 and 36 provided with valves 38, 40 and 42, respectively, so that the gas flow introduced into the desulfurization towers may be controlled. Alternatively, the flow of gases may be controlled by utilizing the flow resistance of the exhaust gases in the desulfurization towers.

In the desulfurization towers 22, 24 and 26 are disposed adsorbent layers 44, 46 and 48, respectively. The upper chambers of the towers 22, 24 and 26 are connected to the upper ducts 62, 64 and 66, respectively, which in turn are connected to a common flue 68 in communication with the flue 16 to discharge the treated gases.

The lower chambers 50, 52 and 54 of the desulfurization towers 22, 24 and 26 below the adsorbent layers 44, 46 and 48 are in communication through pipes 70, 72, 74, 76, 78 and 80 respectively with storage chambers 82 and 84. The desulfurization liquid such as water in the instant embodiment is stored in the storage chambers 82 and 84, and is introduced into the upper chambers 56, 58 and 60 through a pipe 88 and branched pipes 90, 92 and 94 by a pump 86 so that water washes the adsorbent layers in the desulfurization towers to remove the sulfur oxides therefrom into the lower chambers 50, 52 and 54, from which water containing sulfur oxides is returned to the storage chamber 82 through the return pipes 70, 72 and 74.

It should be noted that the gases and water are not simultaneously introduced into the desulfurization towers, and that the desorption or desulfurization water will not be introduced into the desulfurization tower into which the gases are being introduced, but will be introduced into the tower into which the gases are not introduced. In the instant embodiment, the gases and water will not flow through the same tower simultaneously, but it is understood that the gases may mix with water to some little extent without departing the scope of the present invention. In operation it is preferable that one tower is in desorption operation whereas the other two towers are in adsorption operation. When there are used more than two towers in sulfur oxides adsorption operation, it is preferable that one of them is in the process of drying its sulfur oxides adsorption layer with the flowing gases. The weak sulfuric acid collected in the storage chamber is introduced into a pipe 100 through a pipe 98 by a pump 96. The pipe 100 is branched into three pipes 102, 104 and 106 which are connected to distributors 108, 110 and 112 respectively at the tops of the lower chambers 50, 52 and 54 respectively. In the instant embodiment, the distributor 110 is shown as spraying the liquid whereas the other two are shown as stopping the spraying operation. The gases introduced into the lower chamber 50 of the tower 22 from the duct 32 is made to pass through the adsorbent layer 44, whose desorption has been just completed, to dry the layer 44 and cause the sulfur oxides contained in the gases to adhere to or adsorbed by the adsorbent layer 44. Thereafter, the distributor 108 starts spraying the liquid. That is, the distributor 108 is energized intermittently at a suitable time interval depending upon the amount of the adsorbing agent in the adsorption layer, the flow of exhaust gases introduced into the tower, the dimensions of the tower, etc. Sulfuric acid solution 120, 122 in the lower chambers 50 and 52 flow into the storage chamber 84 through the pipes 76 and 78, and is stored therein, and, if required, will be introduced into the pipe 100 by a pump 114.

Sulfuric acid concentrated in the storage chamber 84 will be withdrawn through a pipe 118 by a pump 116 as will be described in more detail hereinafter. Referring to FIG. 2, a spray nozzle 124 is disposed in the upper portion of the lower chamber 50 of the desulfurization tower 22 and is in communication with the pipe 100. Immediately below the spray nozzle 124 is disposed the distributor 108 which, as shown in FIG. 3, has a plurality of parallel channels transversely of and at right angles to the axis of the spray nozzle 124 so that sulfuric acid solution may be uniformly sprayed from the spray nozzle 124 into the lower chamber 50. Large-diameter coke 126 are placed over the distributor 108, and the adsorption agent layer such as active carbon layer is placed over the coke layer 126. In summary, the distributor 108 has a dual function of spraying sulfuric acid solution and supporting the activated carbon adsorption layer. This arrangement is advantageous in that the construction of the tower may be simplified and the flow resistance of the exhaust gas may be reduced. It is not necessary to bodily provide the lower chamber space, and a suitable packing material such as 3 inch pole ring (porcelain) 136 may be placed in the lower chamber 50 as shown in FIG. 2. This arrangement is advantageous in that the height of the lower chamber 50 may be reduced. The exhaust gases are introduced into the lower chamber 50 through an arcuate wind box 128, and an inlet nozzles 130 connected thereto and opened into the lower chamber 50.

As described hereinabove, the weak sulfuric acid solution collected in the storage chamber 84 is pumped by a pump 114 through the pipe 100 and the spray nozzle 124 to the distributor 108 from which is uniformly distributed into the lower chamber 50. The sprayed solution is made into contact with the exhaust gases moving upwardly from the bottom of the lower chamber 50, and the temperature of the sprayed solution is increased until saturated temperature. A portion of the sprayed solution is vaporized, and is made to pass with the exhaust gases through the coke layer 126 and the activated carbon adsorption layer 44 into the upper chamber 56 of the tower. This steam plays the three major roles. The first role is to concentrate the sulfuric acid solution. In the prior art apparatus the concentration of sulfuric acid solution requires a special apparatus for example, submerged combustion plant. However, according to the present invention, the concentration may be effected in the lower chamber 50 immediately below the activated carbon adsorption layer 44 so that the concentration of sulfuric acid solution as well as the adsorption of sulfur oxides by the activated carbon may be accomplished in the same tower. The second role is to introduce water into the exhaust gas. That is, the adsorption efficiency is not so great when the dried exhaust gas is directly introduced into the activated carbon layer 44. However, according to the present invention the water content of the exhaust gas, which is generally of the order of 10 percent, is increased by 2-5 percent by evolving the steam in the manner described above, so that the sulfur oxides adsorption efficiency may be much improved because the water content facilitates the chemical action of adsorbing sulfur oxides of the activated carbon. The third role is to cool the activated carbon layer 44, especially its lower portion. Of the three roles described above, the first role is the most important, and it should not be understood that the coexistence of the three roles described above is the essential feature of the present invention.

Condensed sulfuric acid solution is withdrawn into the storage chamber 84 through the pipe 76 having a valve 132, and is pumped to the spray nozzle 124 by the pump 114 through the pipe 100 having a valve 134 to be sprayed uniformly into the lower chamber 50 through the distributor 108. Thus while the sulfuric acid solution is concentrated higher and higher as it is recirculated in the manner described above. It is thus possible to increase the concentration of the sulfuric acid solution higher than 65%.

In the upper chamber 56 of the tower 22 is disposed a desorption water spray distributor 138 to which is supplied the desorption water from a spray nozzle 140 which in turn is connected to the branched pipe 90. The desorption water is sprayed to remove the sulfides adsorbed by the activated carbon layer 44 in the desorption step described above. A valve 136 is provided in the pipe 70 for controlling the flow of sulfuric acid therein.

In the apparatus utilizing the activated carbon for desulfurization, it is preferable that the temperature of the exhaust gas immediately before it is introduced into the activated carbon layer 44 is as high as possible in view of the diffusion of the gas at the outlet. On the other hand from the standpoint of the efficiency of adsorption and the consumption of the activated carbon due to oxidation, the temperature of gas at the inlet is preferably maintained less than 130°–150°C. The compromise may be attained by lowering the temperature of the gas to about 130°–150°C by making the gas introduced (exhaust gas) into contact with the sulfuric acid solution. For example, the sulfur oxide adsorption efficiency may be much improved, and the heat dissipated may be advantageously utilized for concentration of sulfuric acid solution by controlling the temperature of the gas to 150°–130°C when it is forced into the activated carbon layer 44.

The data of the design of the practical apparatus in accordance with the present invention will be described. The gas whose temperature is 150°C and flows at a rate of 420,000 Nm³/hr is made into contact with the recirculating sulfuric acid solution in the lower portion of the activated carbon layer to decrease the temperature to 133°C before the gas is introduced into the activated carbon layer. The concentration of sulfuric acid supplied, that is of the solution in the storage chamber 82 is about 20 percent, and the sulfuric acid solution is supplied at a rate of 6,300 kg/hr into the circulating sulfuric acid solution. Due to the concentration by the contact with the exhaust gas and to the supply of dilute sulfuric acid solution, the concentration of the solution in the storage chamber 84 is maintained at about 65 percent, and the solution may be withdrawn at a rate of 1,940/kg/hr. The height of the lower chamber 50 is 1.2 m when it is not packed, but is 0.5 m when packed with a packing material such as 3 inch pole rings.

What is claimed is:

1. An apparatus for desulfurization of exhaust gases containing sulfur oxides, which comprises a plurality of desulfurization tower means having an adsorbent layer for adsorbing sulfur oxides in the exhaust gases disposed therein, means for selectively introducing the exhaust gases into the bottom of each of said tower means to pass upwardly through said adsorbent layer to be discharged from the top of said tower means, means for introducing a desorption solution selectively into said tower means from the top thereof, when introduction of said exhaust gases is stopped, discharge means for withdrawing the desorption solution from the bottom of said tower means to remove sulfuric acid adsorbed by said adsorbent layer to thereby permit the reuse of said adsorbent layer for removal of sulfur oxides in the exhaust gases, a lower chamber formed in each of said tower means immediately below said adsorbent layer, a desorption liquid spraying means disposed in the upper portion of each of said lower chambers for spraying a portion of said desorption solution into said lower chamber to attain gas-liquid contact between said sprayed desorption solution and the exhaust gases entering said tower means, means for intermittently supplying the portion of said desorption solution to said spray means, a control system for regulating said discharge means for withdrawing said desorption solution after said gas-liquid contact and after passage through said adsorption layer and storage means for receiving and for storing said sulfuric acid-containing desorption solution for reuse in said apparatus.

2. An apparatus according to claim 9 wherein said storage means comprises a recirculation system for supplying said portion of desorption solution into said lower chamber via said spraying means to make contact with said exhaust gases and thereafter feeding said sprayed desorption solution to said spraying means again, thereby producing in said lower chamber sulfuric acid with a high concentration.

3. An apparatus according to claim 1 wherein an upper chamber is formed above said adsorbent layer, and a distributor for spraying said desorption solution is disposed in said upper chamber.

4. An apparatus for desulfurization of exhaust gases containing sulfur oxides, which comprises a plurality of desulfurization tower means having an adsorbent layer for adsorbing sulfur oxides in the exhaust gases disposed therein, said adsorbent layer comprising an upper activated carbon layer and a lower large-diameter coke layer, means for selectively introducing the exhaust gases into the bottom of each of said tower means to pass through said adsorbent layer to be discharged from the top of said tower means, means for introducing a desorption solution selectively into said tower means from the top thereof, when introduction of said exhaust gases has stopped, discharge means for withdrawing the desorption solution from the bottom of said tower means to remove sulfuric acid adsorbed by said adsorbent layer to thereby permit the reuse of said adsorbent layer for removal of sulfur oxides in said exhaust gases, a lower chamber formed in each of said tower means immediately below said adsorbent layer, spraying means disposed in the upper portion of each of said lower chambers for spraying a portion of said desorption solution into said lower chamber to attain a gas-liquid contact between said sprayed desorption solution and the exhaust gases entering said tower means, said spraying means comprising a spray nozzle and a distributor disposed immediately below said spray nozzle for spraying the desorption solution from said spray nozzle into the entire space defined by said lower chamber, said distributor thereby providing the dual function of spraying said adsorption solution into said exhaust gases and of supporting the large diameter coke layer as well as the activated carbon layer thereon, and a control system for regulating said discharge means for withdrawing said desorption solution after said gas-liquid contact and after said passage through said adsorption layer.

5. A continuous exhaust gas desulfurization process comprising
  introducing the exhaust gas selectively into the lower chambers of a plurality of desulfurization towers,
  spraying sulfuric acid solution from the top of said lower chamber to make said sulfuric acid solution into contact with said exhaust gas introduced into said lower chamber,
  withdrawing concentrated sulfuric acid solution into storage chamber means,
  passing said exhaust gas after said contact with said sulfuric acid solution through an adsorption layer, thereby removing sulfur oxides in said exhaust gas,
  selectively spraying the desorption solution from the top of the upper chamber of the desulfurization tower into said adsorbent layer, and
  re-using as said desorption solution to be sprayed said sprayed desorption solution which becomes sulfuric acid solution by desorption of said sulfur oxides from said adsorbent layer.

6. A process as set forth in claim 5 wherein the humidity of said exhaust gas is further increased by 2–5 percent by said contact of said solution with said exhaust gas.

7. A process as set forth in claim 5 further comprising interrupting for a predetermined time interval spraying of said sulfuric acid solution in the lower chamber in said desulfurization tower when said exhaust gas is being introduced into the lower chamber thereof, and passing dried exhaust gas directly through said adsorbent layer which is wetted with said desorption solution, thereby drying said adsorbent layer.

* * * * *